United States Patent
Sun et al.

(10) Patent No.: US 9,258,823 B2
(45) Date of Patent: Feb. 9, 2016

(54) INTERFERENCE SUPPRESSION METHOD AND APPARATUS IN MULTI-POINT COORDINATED TRANSMISSION SYSTEM

(75) Inventors: Fanglei Sun, Shanghai (CN); Qinglin Luo, Shanghai (CN); Wei Fang, Shanghai (CN)

(73) Assignee: Alcatel Lucent, Boulogne-Billancourt (FR)

( * ) Notice: Subject to any disclaimer, the term of this patent is extended or adjusted under 35 U.S.C. 154(b) by 137 days.

(21) Appl. No.: 13/977,995
(22) PCT Filed: Jan. 4, 2012
(86) PCT No.: PCT/IB2012/000155
§ 371 (c)(1), (2), (4) Date: Jul. 2, 2013
(87) PCT Pub. No.: WO2012/095745
PCT Pub. Date: Jul. 19, 2012

(65) Prior Publication Data
US 2013/0273950 A1    Oct. 17, 2013

(30) Foreign Application Priority Data
Jan. 10, 2011    (CN) .......................... 2011 1 0006380

(51) Int. Cl.
*H04W 72/08*    (2009.01)
*H04W 28/04*    (2009.01)
*H04B 7/02*    (2006.01)
*H04W 72/12*    (2009.01)

(52) U.S. Cl.
CPC ............ *H04W 72/082* (2013.01); *H04B 7/024* (2013.01); *H04B 7/026* (2013.01); *H04W 28/048* (2013.01); *H04W 72/1226* (2013.01)

(58) Field of Classification Search
CPC ............ H04W 28/048; H04W 72/082; H04W 72/1226; H04W 48/08; H04W 4/06; H04W 52/0274; H04W 72/12; H04W 76/02; H04W 84/12; H04W 88/04

USPC .......... 455/570, 63.1, 114.2, 278.1, 296, 501, 455/67.13, 222; 370/252, 329
See application file for complete search history.

(56) References Cited

U.S. PATENT DOCUMENTS 5,371,734 A * 12/1994 Fischer ......................... 370/311
7,254,399 B2    8/2007 Salokannel et al.
(Continued)

FOREIGN PATENT DOCUMENTS

CN    101515822 A    8/2009
CN    101621320 A    1/2010
(Continued)

OTHER PUBLICATIONS

English Bibliography for Japanese Patent Application Publication No. JP2008277973A, published Nov. 13, 2008, printed from Thomson Innovation on Aug. 25, 2014, 4 pp.
(Continued)

*Primary Examiner* — Minh D Dao
(74) *Attorney, Agent, or Firm* — Fay Sharpe LLP (57) ABSTRACT

The present invention provides an apparatus for suppressing interference in a coordinated multi-point CoMP transmission system, comprising: frame configuration conflicting detection unit configured to detect conflicting frame configurations; frame configuration conflicting notification unit configured to give a notification of conflicting frame configurations; and interference suppression unit configured to suppress interference between a first CoMP cluster and a second CoMP cluster that are adjacent in the CoMP transmission system when detecting conflicting frame configurations. The present invention further provides a method of suppressing interference in a coordinated multi-point CoMP transmission system. The present invention provides a novel solution that may suppress inter-cell UL/DL ICI by adopting coordinated beamforming (CBF) and coordinated scheduling (CS) in a TDD CoMP system, while maintaining sound implementation of CoMP and flexibility of frame configuration in the TDD system.

14 Claims, 5 Drawing Sheets

(56) References Cited

U.S. PATENT DOCUMENTS

| | | | |
|---|---|---|---|
| 2007/0297407 A1* | 12/2007 | Kubota | 370/390 |
| 2009/0239472 A1 | 9/2009 | Chae et al. | |
| 2010/0014463 A1* | 1/2010 | Nagai et al. | 370/328 |
| 2010/0035555 A1 | 2/2010 | Bala et al. | |
| 2010/0097948 A1* | 4/2010 | Barberis | 370/252 |
| 2010/0255854 A1 | 10/2010 | Lee et al. | |
| 2010/0323711 A1* | 12/2010 | Damnjanovic et al. | 455/450 |
| 2011/0032852 A1 | 2/2011 | Xin | |
| 2011/0090885 A1* | 4/2011 | Safavi | 370/338 |
| 2011/0149765 A1* | 6/2011 | Gorokhov et al. | 370/252 |
| 2011/0235608 A1* | 9/2011 | Koo et al. | 370/329 |
| 2011/0280205 A1* | 11/2011 | Qin et al. | 370/329 |
| 2011/0281585 A1* | 11/2011 | Kwon et al. | 455/436 |
| 2012/0002635 A1* | 1/2012 | Chung et al. | 370/329 |
| 2012/0009935 A1* | 1/2012 | Wei | 455/450 |
| 2012/0033540 A1* | 2/2012 | Kim et al. | 370/203 |
| 2012/0051319 A1* | 3/2012 | Kwon et al. | 370/329 |
| 2012/0082070 A1* | 4/2012 | Hart et al. | 370/280 |
| 2012/0147793 A1* | 6/2012 | Chen et al. | 370/280 |
| 2014/0135055 A1* | 5/2014 | Fu et al. | 455/522 |
| 2014/0241199 A1* | 8/2014 | Chun et al. | 370/252 |
| 2014/0241200 A1* | 8/2014 | Chun et al. | 370/252 |
| 2014/0254419 A1* | 9/2014 | Chun et al. | 370/252 |
| 2014/0376519 A1* | 12/2014 | Yang et al. | 370/336 |
| 2015/0016239 A1* | 1/2015 | Yi et al. | 370/201 |

FOREIGN PATENT DOCUMENTS

| | | |
|---|---|---|
| JP | 2008277973 A | 11/2008 |
| TW | I287405 B | 9/2007 |
| TW | 201008164 A1 | 2/2010 |

OTHER PUBLICATIONS

R1-093081; 3GPP TSG RAN WG1 Meeting #58; Shenzen, China, Aug. 24-28, 2009, Distributed Dynamic CoMP for LTE-Advanced, 16 pp.

R1-093608; 3GPP TSG RAN WG1 Meeting #58; Shenzen, China, Aug. 24-28, 2009, Distributed Dynamic CoMP for LTE-Advanced, 18 pp.

R1-093608; 3GPP RAN 1 #58; Shenzhen, China, Aug. 24-28, 2009, (Supplementary) Short PPT document version, 15 pp.

R1-094285; 3GPP TSG RAN WG1 Meeting #58B; Miyazaki, Japan, Oct. 12-16, 2009, Distributed Dynamic CoMP for LTE-Advanced (Revision from R1-093608); 21 pp.

R1-104119; 3GPP TSG-RAN WG1 #61 bis; Dresden, Germany, Jun. 28-Jul. 2, 2010; Discussion on one solution of eICIC interference management for TDD, 3 pp.

R1-105272; 3GPP TSG-RAN WG1 #62bis; Xi'an, China, Oct. 11-15, 2010; Discussion of the possibility of using subframe offset for interference avoidance in TDD systems; 6 pp.

R1-106312; 3GPP TSG-RAN WG #63; Jacksonville, Florida, US; Nov. 15-19, 2010; Discussion on the solutions for common information interference coordination in TDD systems; 5 pp.

R1-082886, 3GPP, Technical Specification Group Radio Access Network, WG1 Meeting #54, Jeju, Korea, Aug. 18-22, 2008, Agenda Item 12, Inter-Cell Interference Mitigation Through Limited Coordination, Samsung, 9 pp.

English Bibliography for Chinese Patent Application Publication No. CN101621320A, published Jan. 6, 2010, printed from Thomson Innovation on Jul. 8, 2014, 4 pp.

English Bibliography for Taiwanese Patent Application Publication No. TW200629932A, published Aug. 16, 2006, printed from Thomson Innovation on Jul. 8, 2014, 2 pp.

English Bibliography for Taiwanese Patent Application Publication No. TWI287405B, published Sep. 21, 2007, printed from Thomson Innovation on Jul. 8, 2014, 5 pp.

English Bibliography for Taiwanese Patent Application Publication No. TW201008164A, published Feb. 16, 2010, printed from Thomson Innovation on Jul. 8, 2014, 3 pp.

International Search Report for PCT/IB2012/000155 dated May 31, 2012.

* cited by examiner

INTERFERENCE SUPPRESSION METHOD AND APPARATUS IN MULTI-POINT COORDINATED TRANSMISSION SYSTEM

FIELD OF THE INVENTION

The present invention relates to a coordinated multi-point (CoMP) transmission system, and in particular, relates to a method and apparatus for suppressing interference between CoMP clusters in a TDD (Time Division Duplexing) CoMP transmission system.

DESCRIPTION OF THE RELATED ART

Coordinated multi-point transmission has been considered for LTE-Advanced as a key tool to improve the coverage of high data rates and the cell-edge throughput and to increase system throughput. A generic concept of coordinated multi-point transmission is that antenna sites (or base stations) connected via a backbone network are coordinated to serve a mobile station and neighboring antenna sites or base stations serve the mobile station simultaneously, thereby improving the data rate of a mobile station.

In a TDD CoMP system, it is expected that the TDD CoMP may achieve a higher performance gain by leveraging the advantage of channel reciprocity between uplink and downlink. Additionally, another well-known advantage of the TDD system over FDD system is that its air-interface frame structure is uplink-downlink asymmetric, which means the frame structure may be dynamically configured to increase spectrum efficiency with the variation of the uplink and downlink traffics. However, in actual deployment, different frame configurations of neighboring CoMP clusters may generate strong inter-cell interferences (ICI) between the neighboring clusters, including both eNB (enhanced-NodeB)-to-eNB and UE (user equipment)-to-UE interference, which may cause serious degradation of CoMP performance.

Figure 1:
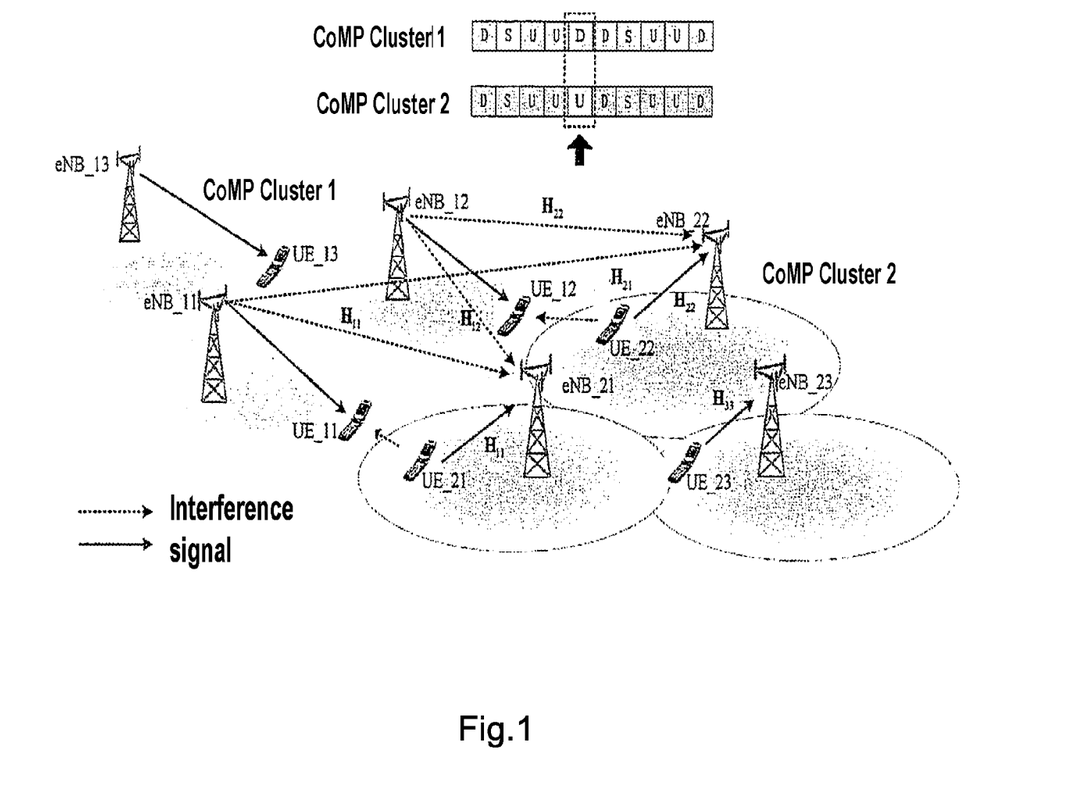
FIG. 1 is a schematic diagram of a TDD CoMP transmission scenario in which the present invention may be implemented.

As illustrated in FIG. 1, suppose the TDD CoMP transmission system comprises two neighboring CoMP clusters, namely, CoMP cluster 1 and CoMP cluster 2 in FIG. 1. If the sub-frame configuration of CoMP cluster 1 is different from that of CoMP cluster 2, i.e., as illustrated in FIG. 1, when the CoMP cluster 1 is downlink, the CoMP cluster 2 is uplink, then two types of ICIs will occur, including:

1) eNB-to-eNB interference. For example, as illustrated in FIG. 1, the eNB_11 in CoMP cluster 1 is in downlink of the UE_11 in CoMP cluster 1, while the eNB_21 in CoMP cluster 2 is just in uplink of UE_21 in CoMP cluster 2. At this point, the eNB_11 in CoMP cluster 1 will generate an interference to eNB_21 in CoMP cluster 2. Namely, the eNB in uplink will be interfered by the downlink eNB in the neighboring CoMP cluster; and 2) UE-to-UE interference. For example, as illustrated in FIG. 1, the UE_11 in CoMP cluster 1 is in downlink of the eNB_11 in CoMP cluster 1, while the UE_21 in CoMP cluster 2 is just in uplink of eNB_21 in CoMP cluster 2. At this point, the UE_21 in CoMP cluster 2 will generate an interference to UE_11 in CoMP cluster 1. Namely, the UE in downlink will be interfered by the uplink UE in the neighboring CoMP cluster. Particularly, when the UEs are very adjacent, the interference could be overwhelming.

In the two types of ICIs, because the transmission power of eNB is far higher than UE, the eNB-to-eNB ICI will be more significant.

In the prior art, some noise suppression mechanisms and joint processing (needing channel and data exchange) schemes have been proposed, which are mainly used for inter-cell UL/DL ICI management in a TDD system, but a solution specific to the TDD CoMP system is still silent. Even for a single-cell TDD system, noise suppression for conflicting sub-frames will also cause bandwidth wastage, while joint processing schemes will cause high processing complexity.

Therefore, a solution is desirable to suppress inter-cell UL/DL ICI in a TDD CoMP system, while maintaining sound implementation of CoMP and flexibility of frame configuration in the TDD system.

SUMMARY OF THE INVENTION

In order to solve the above problem, the present invention provides a novel solution that may suppress inter-cell UL/DL ICI by adopting coordinated beamforming (CBF) and coordinated scheduling (CS) in a TDD CoMP system, while maintaining sound implementation of CoMP and flexibility of frame configuration in the TDD system.

According to one aspect of the present invention, there is provided an apparatus for suppressing interference in a coordinated multi-point CoMP transmission system, comprising: frame configuration conflicting detection unit configured to detect conflicting frame configurations; frame configuration conflicting notification unit configured to give a notification of conflicting frame configurations; and interference suppression unit configured to suppress interference between a first CoMP cluster and a second CoMP cluster that are adjacent in the CoMP transmission system when detecting conflicting frame configurations.

Preferably, the interference comprises a base station-to-base station interference from at least one interfering base station in the first CoMP cluster to a first base station in the second CoMP base station.

Preferably, the interference suppression unit suppresses the base station-to-base station interference from the at least one interfering base station to the first base station in the second CoMP base station by a pre-coding design performed at the at least one interfering base station side.

Preferably, the interference suppression unit comprises: a channel matrix conversion unit configured to convert a channel matrix corresponding to a downlink channel into a corresponding zero space; and pre-coding unit configured to pre-code a signal to be transmitted by the at least one interfering base station by utilizing the corresponding zero space as a pre-coding matrix.

Preferably, the interference suppression unit suppresses the base station-to-base station interference from the at least one interfering base station to the first base station in the second CoMP base station at the first base station side.

Preferably, the interference suppression unit comprises: interfering signal determination unit configured to extract useful components and interfering components step by step from signals received from the first base station based on a channel matrix corresponding to a downlink channel from the at least one interfering base station to the first base station and based on a channel matrix corresponding to an uplink channel from the first base station to the corresponding user equipment UE; and interfering component cancellation unit configured to cancel the interfering components.

Preferably, the apparatus is located at the first base station.

Preferably, the interference comprises a UE-to-UE interference from a cell-edge user equipment UE in the first CoMP cluster to a first UE in the second CoMP cluster, wherein the cell-edge UE is adjacent to the first UE.

Preferably, the interference suppression unit comprises: a schedule notification unit configured to notify the second CoMP cluster of a schedule result when the cell-edge UE is called; and a schedule determination unit configured to determine not to schedule the first UE when receiving the schedule result.

According to another aspect of the present invention, there is provided a method of suppressing interference in a coordinated multi-point CoMP transmission system, comprising the following steps: detecting conflicting frame configurations; giving a notification of conflicting frame configurations; and suppressing an interference between a first CoMP cluster and a second CoMP interference that are adjacent in a CoMP transmission system when detecting the conflicting frame configurations.

Preferably, the interference comprises a base station-to-base station interference from at least one interfering base station in the first CoMP cluster to a first base station in the second CoMP base station.

Preferably, the step of suppressing an interference between a first CoMP cluster and a second CoMP interference that are adjacent in a CoMP transmission system comprises: converting a channel matrix corresponding to a downlink channel from the at least one interfering base station to the first base station into a corresponding zero space; and pre-coding a signal to be transmitted by the at least one interfering base station by utilizing the corresponding zero space as a pre-coding matrix.

Preferably, the step of suppressing an interference between a first CoMP cluster and a second CoMP interference that are adjacent in a CoMP transmission system comprises: extracting useful components and interfering components step by step from signals received from the first base station based on a channel matrix corresponding to a downlink channel from the at least one interfering base station to the first base station and based on a channel matrix corresponding to an uplink channel from the first base station to the corresponding user equipment UE; and cancelling the interfering components.

Preferably, the interference comprises a UE-to-UE interference from a cell-edge user equipment UE in the first CoMP cluster to a first UE in the second CoMP cluster, wherein the cell-edge UE is adjacent to the first UE.

Preferably, the step of suppressing an interference between a first CoMP cluster and a second CoMP interference that are adjacent in a CoMP transmission system comprises: notifying the second CoMP cluster of a schedule result to when the cell-edge UE is called; and determining not to schedule the first UE when receiving the schedule result.

Over the existing schemes, the present invention suppresses an inter-cell UL/DL ICI by adopting coordinated beamforming (CBF) and coordinated scheduling (CS) in a TDD CoMP system, while maintaining sound implementation of CoMP and flexibility of frame configuration in the TDD system.

BRIEF DESCRIPTION OF THE DRAWINGS

The above and other objectives, features and advantages of the present invention will become more apparent by describing the preferred embodiments in conjunction with the following drawings.

DETAILED DESCRIPTION OF THE INVENTION

Hereinafter, the preferred embodiments of the present invention will be described in detail with reference to the accompanying drawings, wherein details and functions unnecessary to the present invention will be omitted during the description process so as to avoid confusing the understanding of the present invention.

In the present invention, in order to well implement CoMP transmission while maintaining the flexibility of frame configuration in the TDD system, it is provided to suppress inter-cell UL/DL ICI by adopting coordinated beamforming (CBF) and coordinated scheduling (CS) in a TDD CoMP system.

FIG. 1 is a schematic diagram of a TDD CoMP transmission scenario in which the present invention may be implemented. As illustrated in FIG. 1, the TDD CoMP transmission system comprises two neighboring CoMP clusters, i.e., CoMP cluster 1 and CoMP cluster 2, wherein the CoMP cluster 1 comprises three base stations (eNB_11, eNb_12, and eNB_13) and three user equipments (UE_11, UE_12, and UE_13), and CoMP cluster 2 also comprises three base stations (eNB_21, eNB_22, and eNB_23) and three user equipments (UE_21, UE_22, and UE_23).

Here, suppose the frame configurations of cells within each cluster are identical, while the sub-frame configurations of CoMP cluster 1 are different from those of CoMP cluster 2, for example, the sub-frame configurations as illustrated in FIG. 1. In this case, two types of ICIs exist between CoMP cluster 1 and CoMP cluster 2, namely, eNB-to-eNB interference, and UE-to-UE interference. For example, the uplink eNB_21 may be interfered by the eNB-to-eNB interference from eNB_11 and eNB_12 that are located downlink (here, because eNB_13 is far from eNB_21, the interference of eNB_13 to eNB_21 will not be considered). Likewise, when a UE in CoMP cluster 1 is adjacent to a UE in CoMP 2, for example, the UE_11 located downlink in the CoMP cluster 1 will be subjected to the UE-to-UE interference from the UE_21 located uplink in the CoMP cluster 2.

Figure 2:
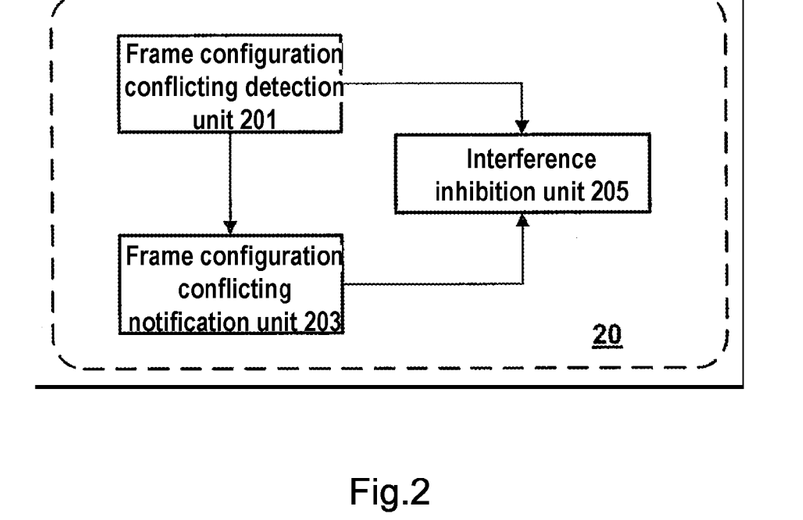
FIG. 2 is a schematic block diagram of an apparatus according to the present invention for suppressing interference between CoMP clusters in the scenario as illustrated in FIG. 1.

FIG. 2 is a schematic block diagram of an apparatus 20 for suppressing interference between CoMP clusters in the scenario as illustrated in FIG. 1 according to the present invention. As illustrated in FIG. 2, the apparatus 20 comprises a frame configuration conflicting detection unit 201 configured to detect conflicting frame configurations; frame configuration conflicting notification unit 203 configured to give a notification of the conflicting frame configurations; and interference suppression unit 205 configured to suppress interference between the CoMP cluster 1 and the CoMP cluster 2 when detecting conflicting frame configurations, for example, eNB-to-eNB interference and UE-to-UE interference.

Figure 3:
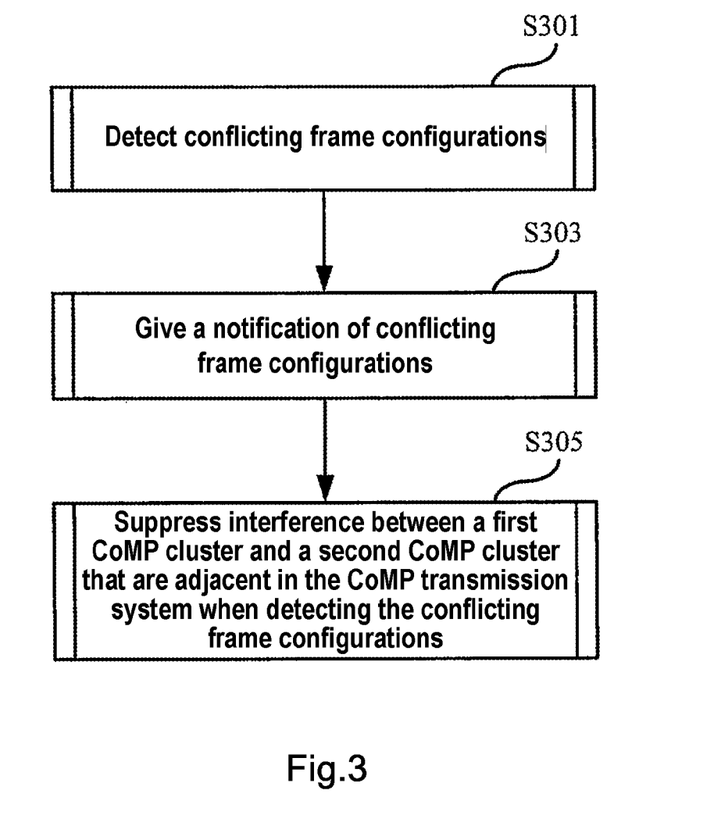
FIG. 3 is a flow chart of a method according to the present invention for suppressing interference between CoMP clusters in the scenario as illustrated in FIG. 1.

FIG. 3 is a flow chart of a method for suppressing interference between CoMP clusters in the scenario as illustrated in FIG. 1 according to the present invention. As illustrated in FIG. 3, the method comprises step 301 of detecting conflicting frame configurations; step 303 of giving a notification of the conflicting frame configurations, and step 305 of suppressing interference between the CoMP cluster 1 and the CoMP cluster 2 when detecting conflicting frame configurations, for example, eNB-to-eNB interference and UE-to-UE interference.

In the present invention, CBF and CS are adopted to suppress the eNB-to-eNB interference and the UE-to-UE interference, respectively. Hereinafter, specific processing (namely, processing in above step 305) on the eNB-to-eNB interference and the UE-to-UE interference according to the present invention will be described in detail, respectively.

[eNB-to-eNB Interference]

For the eNB-to-eNB interference, interference suppression may be performed by CBF either at the interfering side (for example, eNB_11 and eNB_12 located at downlink transmission) or at the interfered side (for example, eNB_21 located at uplink receipt). Here, suppose cells within neighboring clusters know the SCI-RSs and cell IDs of each other, i.e., channel matrixes $\tilde{H}_{ij}$ between eNBs from different CoMP clusters are measurable. Because when the CSI-RSs and cell IDs are known, the measurement of channel matrix is known to those skilled in the art, it will not be detailed here.

Embodiment 1

At the interfering side, i.e., the transmitting side, different transmission beamforming may be pre-determined by the measurable channels between eNBs and the channel reciprocity of the TDD system. Besides, a new feature of the CBF of the TDD CoMP system lies in that because CBF is adopted between CoMP clusters, coordinated/invalid beamformer may be independently indicated through cells at cluster edges or indicated jointly by the eNBs within the DL transmission clusters.

Figure 4:
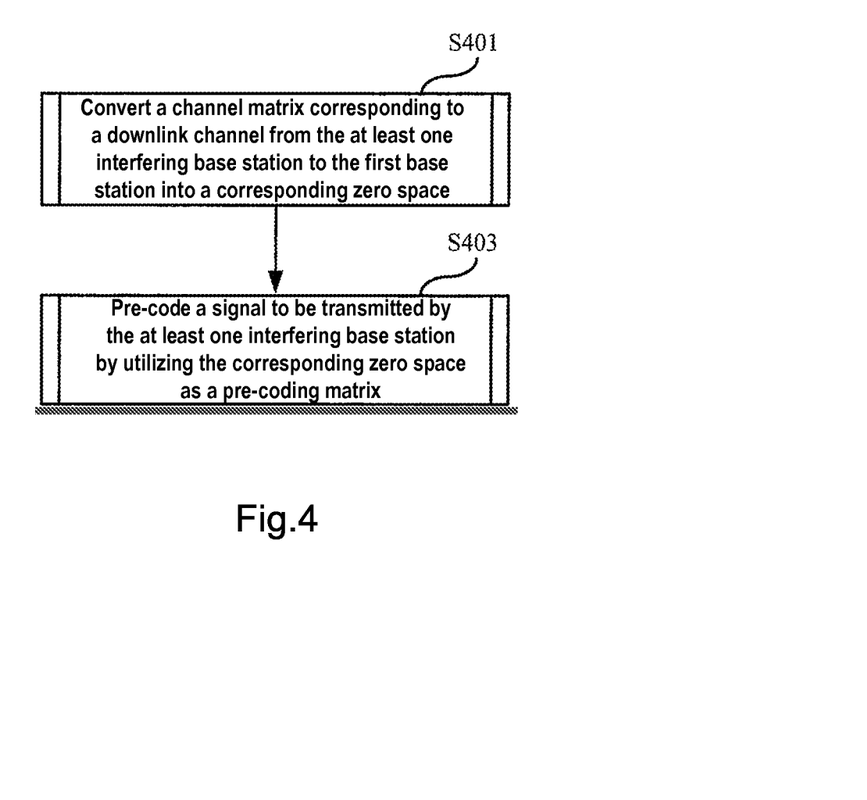
FIG. 4 is a flow chart of a method for suppressing eNB-to-eNB interference according to the present invention.

FIG. 4 is a flow chart of a method for suppressing eNB-to-eNB interference according to the present invention.

As illustrated in FIG. 4, at step 401, the channel matrix corresponding to a channel from at least one interfering base station to an interfered base station is converted into a corresponding zero space.

For example, the channel matrix $\tilde{H}_{11}$ between eNB_11 and eNB_21 as illustrated in FIG. 1 is converted into a corresponding zero space. Then, at step 403, a corresponding zero space is utilized as a pre-coding matrix to pre-code a signal to be transmitted by the at least one interfering base station.

As illustrated in FIG. 1, $\tilde{H}_{ij}$ indicates a channel matrix from eNB_1j within cluster 1 to eNB_2i in cluster 2. $H_{ij}^{(n)}$ indicates a channel matrix from UE_nj inside the CoMP cluster n to eNB_ni. It may be clearly seen from FIG. 1 that the uplink transmission of eNB_21 in the CoMP cluster 2 is subjected to serious interference from the downlink transmission from eNB_11 and eNB_12 in cluster 1. Thus, the uplink received signal $r_{11}^{(2)}$ from UE_21 to eNB_21 is represented as:

$$r_{11}^{(2)} = H_{11}^{(2)} F_{11}^{(2)} s_{11}^{(2)} + I_{DL}^{(2)} + I_{UL}^{(2)} + n$$

wherein, $s_{11}^{(2)}$ denotes the signal received by eNB_21 from UE_21, $F_{11}^{(2)}$ denotes the pre-coding matrix of the signal transmitted from UE_21, $I_{DL}^{(2)}$ denotes DL interference from the cluster 1, and $I_{UL}^{(1)}$ denotes other UL interference.

Because other UL interferences have been generally resolved in the FDD CoMP system, this part of interferences will be omitted, while the present invention mainly focuses on $I_{DL}^{(2)}$ suppression.

In the present invention, zero space of $\tilde{H}_{11}$ is utilized as the pre-coding matrix of eNB_11.

The pre-coding matrix may be expressed as:

$$F_{11}^{(1)} = I - \tilde{H}_{11}^{H}(\tilde{H}_{11}\tilde{H}_{11}^{H})^{-1}\tilde{H}_{11}.$$

Likewise, considering the DL interference of eNB_12 to eNB_21, a similar pre-coding scheme may also be adopted to pre-code the signal transmitted downlink from the eNB_12. Specifically, eNB_12 adopts the following pre-coding matrix:

$$F_{22}^{(1)} = I - \tilde{H}_{12}^{H}(\tilde{H}_{12}\tilde{H}_{12}^{H})^{-1}\tilde{H}_{12}$$

In this case, the DL interference of eNB_11 and eNB_12 to eNB_21 may be indicated as:

$$I_{DL}^{(2)} = \tilde{H}_{11}F_{11}^{(1)}s_{11}^{(1)} + \tilde{H}_{12}F_{22}^{(1)}s_{22}^{(1)}.$$

In other words, utilizing pre-coding matrixes $F_{11}^{(1)}$ and $F_{22}^{(1)}$ may completely suppress the DL interference of eNB_11 and eNB_12 to eNB_21.

A key value of CoMP transmission lies in its strong joint processing capability. In the TDD CoMP system, joint pre-coding designs different from the pre-coding design for independent cells in a cluster may be adopted. For example, joint pre-coding is conducted with respect to eNB_11 and eNB_12 in cluster 1 so as to suppress the zero space extension from eNB to eNB ICI.

The joint channel matrix for eNB_11 and eNB_12 with respect to eNB_21 is $\tilde{H}=[\tilde{H}_{11}\tilde{H}_{12}]$, and the joint pre-coder for eNB_11 and eNB_12 is determined through the following equation:

$$F^{(1)} = I - \tilde{H}^{H}(\tilde{H}\tilde{H}^{H})^{-1}\tilde{H}$$

In this way, all DL ICIs from eNB_11 and eNB_12 in cluster 1 to eNB_21 may also be suppressed.

It should be noted that the above description is under the precondition that downlink transmission of eNB_11 and eNB_12 in CoMP cluster 1 will cause interference to eNB_21. However, it should be understood that the above method is likewise applicable to the following scenarios: a scenario where one of eNB_11 and eNB_12 generates an interference to eNB_21, a scenario where more than two eNBs in the CoMP cluster 1 generate an interference to eNB_21, and a scenario where at least one eNB in CoMP cluster 1 simultaneously generates an interference to eNB_21 and eNB_22 (or more eNBs even in CoMP cluster 2).

Although zero forcing pre-coding method has been adopted above as an interference inhibition algorithm at the transmitting side (i.e., interfering side), the present invention is not limited to the zero forcing pre-coding method. A similar method comprises a method of maximizing a signal-to-leakage ration (SLNR) based pre-coding, etc.

Figure 5:
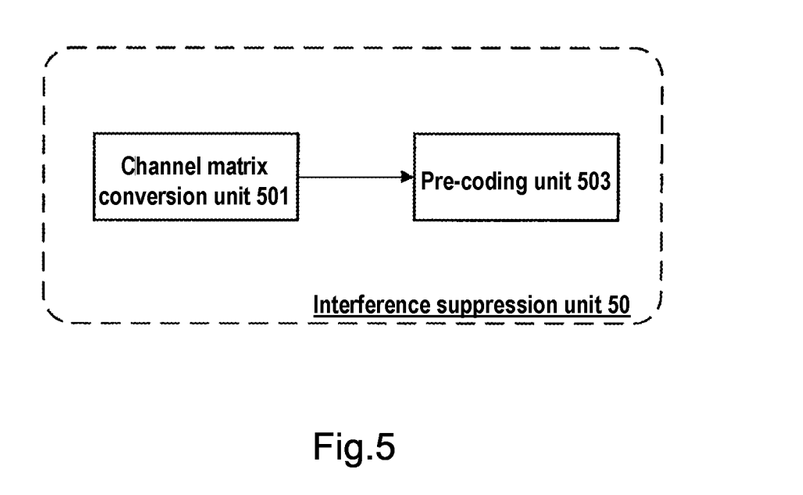
FIG. 5 is a schematic block diagram of an interference suppression unit configured to suppress eNB-to-eNB interference according to the present invention.

FIG. 5 is a schematic block diagram of an interference suppression unit configured to suppress eNB-to-eNB interference according to the present invention. As illustrated in FIG. 5, the interference suppression unit 50 comprises: a channel matrix conversion unit 501 configured to convert a channel matrix corresponding to a downlink channel into a corresponding zero space; and pre-coding unit 503 configured to pre-code a signal to be transmitted by the at least one interfering base station by utilizing the corresponding zero space as a pre-coding matrix.

In this example, the interference suppression unit 50 may be located at eNB_11 or eNB_12 in the CoMP cluster 1.

Embodiment 2

At the interfered side, i.e., the receiving side, a plurality of linear processing methods may be adopted to suppress eNB-to-eNB ICI, for example, interference invalid, successive inter-cell interference cancellation (SIC). Although the processing in the receiver is also restrained by limited space, like processing in the transmitter, it is not limited by the receiving power, i.e., any receiving power supposition is allowed. Thus, the processing at the receiver side is more practical.

Figure 6:
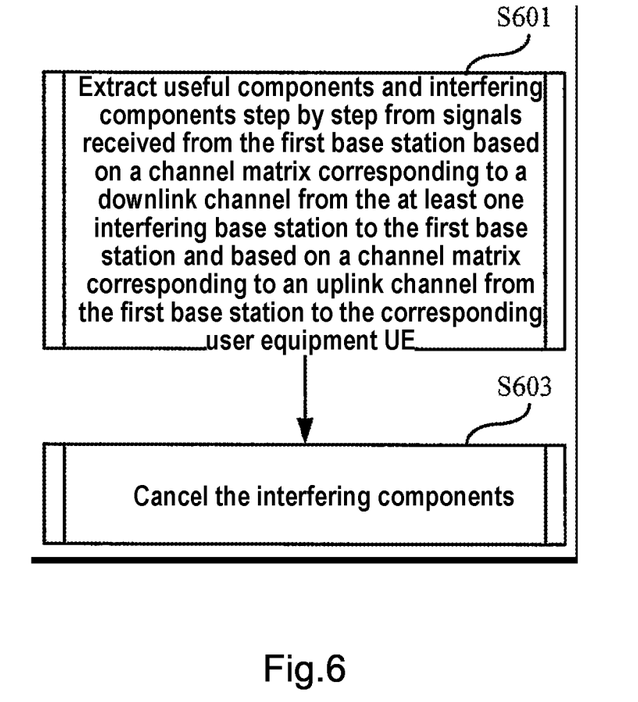
FIG. 6 is a schematic block diagram of another interference suppression unit configured to suppress eNB-to-eNB interference according to the present invention.

FIG. 6 is a flow chart of another method for suppressing eNB-to-eNB interference according to the present invention.

As illustrated in FIG. 6, at step 601, useful components and interfering components are extracted step by step from signals received from the first base station based on a channel matrix corresponding to a downlink channel from the at least one interfering base station to the first base station and based on a channel matrix corresponding to an uplink channel from the first base station to the corresponding user equipment UE. Then, at step 603, interfering components are cancelled.

The receiver beamforming for suppressing eNB-to-eNB ICI is identical to the previously mentioned, but it is implemented at the interfered side.

In this part, successive interference cancellation SIC algorithm is adopted to suppress the eNB-to-eNB ICI. Suppose $H=[\tilde{H}_{11}\ \tilde{H}_{12}\ H_{11}^{(2)}]$, then the UL receiving signaling in its own cell and the DL interference signaling from a neighboring cluster may be determined through the following procedure:

$$\text{Initialization } G_1 = H^+$$
$$i = 1$$
$$\text{Iteration: } k_i = \arg\min_{j \neq \{k_1 \ldots k_{i-1}\}} \|(G_i)_j\|^2$$
$$w_{k_i} = (G_i)_{k_i}$$
$$y_{k_i} = w_{k_i}^T s_i$$
$$\hat{a}_{k_i} = Q(y_{k_i})$$
$$r_{i+1} = r_i - \hat{a}_{k_i}(H)_{k_i}$$
$$G_{i+1} = H_{\bar{k}_i}^+$$
$$i = i + 1,$$

wherein "+" denotes Moore-Penrose pseudo-inverse, $(G_i)_j$ denotes the $j^{th}$ line of $G_i$. $H_{\bar{k}_i}^+$ denotes a matrix obtained by zeroing columns $k_1 \ldots k_{i-1}, k_i$, and $Q(\cdot)$ denotes quantization (slicing) operation appropriate to the constellation in use. If the interfering signal is strong enough, it may be first resolved. Then, the source signal may be obtained by subtracting the interfering signal to obtain the originally received signal.

Figure 7:
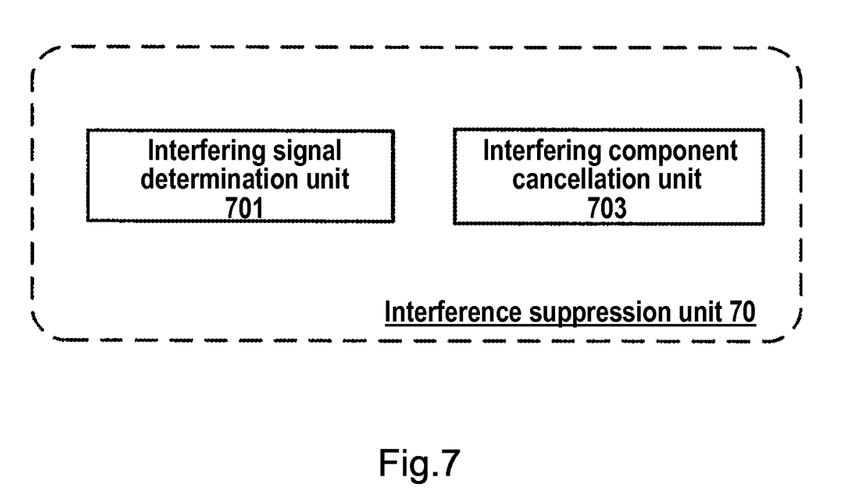
FIG. 7 is a schematic block diagram of a further interference suppression unit configured to suppress eNB-to-eNB interference according to the present invention.

FIG. 7 is a schematic block diagram of a further interference suppression unit configured to suppress eNB-to-eNB interference according to the present invention;

As illustrated in FIG. 7, the interference suppression unit 70 comprises: interfering signal determination unit 701 configured to extract useful components and interfering components step by step from signals received from the first base station based on a channel matrix corresponding to a downlink channel from the at least one interfering base station to the first base station and based on a channel matrix corresponding to an uplink channel from the first base station to the corresponding user equipment UE; and interfering component cancellation unit 703 configured to cancel the interfering component.

In this example, the interference suppression unit 70 may be located at eNB_21 in the CoMP cluster 2.

[UE-to-UE Interference]

For UE-to-UE interference, particularly the scheduling UEs in neighboring clusters are adjacent to each other, interference may be overwhelming. Through asynchronous scheduling a neighboring UE in different sub-frame UL/DL configurations, the CS between neighboring CoMP clusters may effectively avoid ICI.

When scheduling UEs in neighboring clusters are adjacent to each other, interference may be overwhelming. Thus, an effective method to combat UE-to-UE ICI is to avoid simultaneously scheduling two neighboring cluster edge UEs that have different UL/DL configurations.

Hereinafter, description will be made with reference to FIGS. 8 and 9 with the interference between neighboring UE_11 and UE_21 in FIG. 1 as an example.

Figure 8:
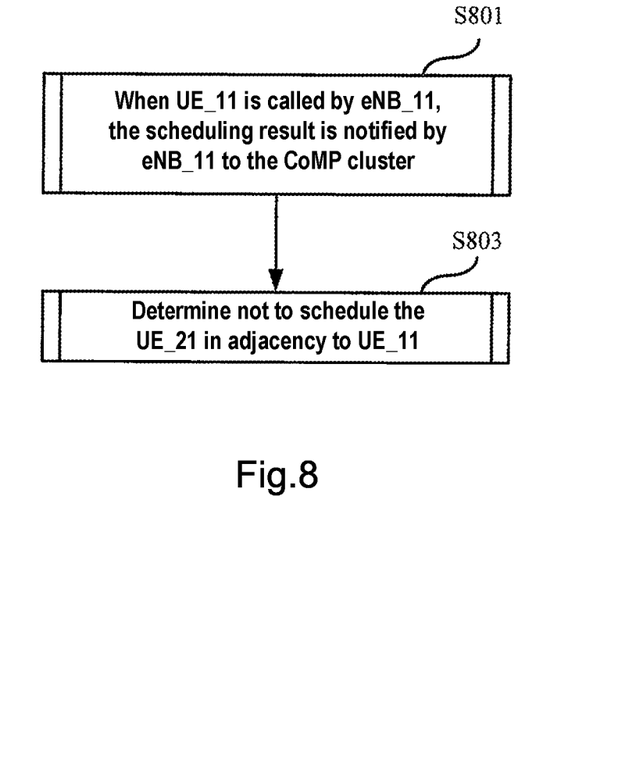
FIG. 8 is a flow chart of a method for suppressing UE-to-UE interference according to the present invention.

FIG. 8 is a flow chart of a method for suppressing UE-to-UE interference according to the present invention.

As illustrated in FIG. 8, at step 801, when UE_11 is called by eNB_11, the scheduling result is notified by eNB_11 to the second CoMP cluster. Next, at step 803, after eNB_21 receives the scheduling result, it determines not to schedule the UE_21 in adjacency to UE_11. In this way, it may be avoided to simultaneously schedule two neighboring cluster edge UEs that have different UL/DL configurations.

Figure 9:
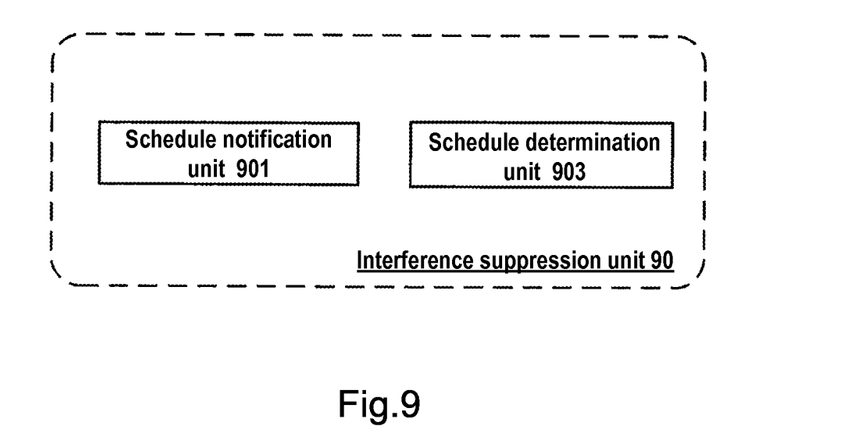
FIG. 9 is a schematic block diagram of an interference suppression unit configured to suppress UE-to-UE interference according to the present invention.

FIG. 9 is a schematic block diagram of an interference suppression unit configured to suppress UE-to-UE interference according to the present invention.

As illustrated in FIG. 9, the interference suppression unit 90 comprises: a schedule notification unit 901 configured to notify a second CoMP cluster of a schedule result when UE_11 is called; and a schedule determination unit 903 configured to determine not to schedule UE_21 in adjacency to UE_11 when receiving the schedule result.

The CBF/CS solution provided in the present invention may guarantee performance gain with less signaling exchange and lower complexity.

Other settings of the embodiments of the present invention as disclosed here comprise software program that execute the steps and operations of the embodiments that have been previously described in brief and will be described in detail. More specifically, a computer program product comprises one of the following embodiments: comprising a computer readable medium that is encoded thereon with computer program logic; when executed on a computing device, the computer program logic provides relevant operation to thereby provide the above interference suppression plan. When executed on at least one processor of the computing device, the computer program logic enables the processor to execute the operation (method) as described in the embodiments of the present invention. Such setting of the present invention is provided typically as software, codes and/or other data structures arranged or encoded on a computer readable medium such as optical medium (for example CD-ROM), floppy disk, or hard disk, etc., or other mediums for firmware or other microcodes on one or more ROMs, or RAMs or PROM chips, or application-specific integrated circuit (ASIC), or downloadable software image or sharing database in one or more modules, etc. Software or firmware or such configuration may be assembled on a computing device, such that one or more processors in the computing device may implement the technology as described in the embodiments of the present invention. A software process performed in combination with for example a set of communication devices, or computing devices in other entities may also provide a system according to the present invention. The system according to the present invention may also be distributed among a plurality of software processes on a plurality of data communication devices, or among all software processes run on a set of small-sized dedicated computers, or among all software processes run on a single computer.

It should be understood that, strictly speaking, the embodiments of the present invention may be embodied as software program, software, and hardware on a data processing device, or an individual software and/or individual circuit.

By far, the present invention has been described with reference to the preferred embodiments. It should be understood that those skilled in the art may make various kinds of other changes, substitutions and additions without departing from the spirit and scope of the present invention. Thus, the scope of the present invention is not limited to the above specific embodiments, which should be defined by the appended claims.

What is claimed is:

1. An apparatus for suppressing interference in a coordinated multi-point (CoMP) transmission system, comprising:
a frame configuration conflicting detection unit configured to detect conflicting frame configurations;
a frame configuration conflicting notification unit configured to give a notification of conflicting frame configurations; and
an interference suppression unit configured to suppress interference between a first CoMP cluster and a second CoMP cluster that are adjacent in the CoMP transmission system when detecting the conflicting frame configurations.

2. The apparatus according to claim 1, wherein the interference comprises a base station-to-base station interference from at least one interfering base station in the first CoMP cluster to a first base station in the second CoMP base station.

3. The apparatus according to claim 2, wherein the interference suppression unit suppresses the base station-to-base station interference from the at least one interfering base station to the first base station in the second CoMP base station by a pre-coding design performed at the at least one interfering base station side.

4. The apparatus according to claim 3, wherein the interference suppression unit comprises:
channel matrix conversion unit configured to convert a channel matrix corresponding to a downlink channel into a corresponding zero space; and
a pre-coding unit configured to pre-code a signal to be transmitted by the at least one interfering base station by utilizing the corresponding zero space as a pre-coding matrix.

5. The apparatus according to claim 2, wherein the interference suppression unit suppresses at the first base station side the base station-to-base station interference from the at least one interfering base station to the first base station in the second CoMP base station.

6. The apparatus according to claim 5, wherein the interference suppression unit comprises:
an interfering signal determination unit configured to extract useful components and interfering components step by step from signals received from the first base station based on a channel matrix corresponding to a downlink channel from the at least one interfering base station to the first base station and based on a channel matrix corresponding to an uplink channel from the first base station to the corresponding user equipment (UE); and
an interfering component cancellation unit configured to cancel the interfering components.

7. The apparatus according to claim 1, wherein the interference comprises a UE-to-UE interference from a cell-edge user equipment (UE) in the first CoMP cluster to a first UE in the second CoMP cluster, wherein the cell-edge UE is adjacent to the first UE.

8. The apparatus according to claim 7, wherein the interference suppression unit comprises:
a schedule notification unit configured to notify the second CoMP cluster of a schedule result when the cell-edge UE is called; and
a schedule determination unit configured to determine not to schedule the first UE when receiving the schedule result.

9. A method for suppressing interference in a coordinated multi-point (CoMP) transmission system, comprising:
detecting conflicting frame configurations at a frame configuration conflicting detection unit of an apparatus;
giving a notification of conflicting frame configurations at a frame configuration conflicting notification unit of the apparatus; and
suppressing interference between a first CoMP cluster and a second CoMP cluster that are adjacent in the CoMP transmission system after detecting the conflicting frame configurations at an interference suppression unit of the apparatus.

10. The method according to claim 9, wherein the interference comprises a base station-to-base station interference from at least one interfering base station in the first CoMP cluster to a first base station in the second CoMP base station.

11. The method according to claim 10, wherein suppressing an interference between the first CoMP cluster and the second CoMP interference comprises:
converting a channel matrix corresponding to a downlink channel from the at least one interfering base station to the first base station into a corresponding zero space; and
pre-coding a signal to be transmitted by the at least one interfering base station by utilizing the corresponding zero space as a pre-coding matrix.

12. The method according to claim 10, wherein suppressing interference between the first CoMP cluster and the second CoMP interference comprises:
extracting useful components and interfering components step by step from signals received from the first base station based on a channel matrix corresponding to a downlink channel from the at least one interfering base station to the first base station and based on a channel matrix corresponding to an uplink channel from the first base station to the corresponding user equipment (UE); and
cancelling the interfering components.

13. The method according to claim 9, wherein the interference comprises a UE-to-UE interference from a cell-edge user equipment (UE) in the first CoMP cluster to a first UE in the second CoMP cluster, wherein the cell-edge UE is adjacent to the first UE.

14. The method according to claim 13, wherein suppressing an interference between a first CoMP cluster and a second CoMP interference that are adjacent in a CoMP transmission system comprises:
notifying the second CoMP cluster of a schedule result to when the cell-edge UE is called; and
determining not to schedule the first UE when receiving the schedule result.

* * * * *